(12) United States Patent
Silvester

(10) Patent No.: US 7,085,536 B2
(45) Date of Patent: Aug. 1, 2006

(54) METHOD AND APPARATUS FOR DYNAMICALLY RESOLVING RADIO FREQUENCY INTERFERENCE PROBLEMS IN A SYSTEM

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 10/155,325

(22) Filed: May 23, 2002

(65) Prior Publication Data

US 2004/0203364 A1    Oct. 14, 2004

(51) Int. Cl.
*H04B 1/00* (2006.01)
*H04B 1/04* (2006.01)
*H04B 17/00* (2006.01)
*H04B 7/00* (2006.01)
*H04B 1/10* (2006.01)

(52) U.S. Cl. ............... 455/63.1; 455/114.2; 455/115.1; 455/278.1; 455/296

(58) Field of Classification Search .............. 455/63.1, 455/114.2, 115.1, 278.1, 296, 556.1, 556.2, 455/557, 255, 298, 300, 301, 310
See application file for complete search history.

(56) References Cited

U.S. PATENT DOCUMENTS

| | | | | |
|---|---|---|---|---|
| 5,512,823 A | * | 4/1996 | Nepveu | 324/258 |
| 5,953,671 A | * | 9/1999 | Childress | 455/512 |
| 6,023,463 A | * | 2/2000 | Wiedeman et al. | 370/344 |
| 6,243,371 B1 | * | 6/2001 | Chawla et al. | 370/347 |
| 6,449,461 B1 | * | 9/2002 | Otten | 455/63.1 |
| 6,501,945 B1 | * | 12/2002 | Chien | 455/296 |
| 6,564,038 B1 | * | 5/2003 | Bethea et al. | 455/63.1 |
| 6,771,968 B1 | * | 8/2004 | Heubel | 455/454 |
| 2003/0013451 A1 | * | 1/2003 | Walton | 455/447 |
| 2003/0125019 A1 | * | 7/2003 | Bajikar | 455/420 |

* cited by examiner

*Primary Examiner*—Lester G. Kincaid
*Assistant Examiner*—Un C. Cho
(74) *Attorney, Agent, or Firm*—Blakely, Sokoloff, Taylor & Zafman LLP

(57) ABSTRACT

In one embodiment, there is provided a method comprising determining if one or more devices in a system is a conflicting device which device which conflicts with a wireless communications interface in the system by radio frequency which interferes with an operation of the wireless communications interfaces; and dynamically resolving each conflict during operation of the system. According to another embodiment, there is provided a system which includes a conflict detection unit to detect if one or more devices in the system is a conflicting device which conflicts with a wireless communications interface in the system by producing radio frequency which interferes with an operation of the wireless communications interface; and a conflict resolution unit to dynamically resolve each conflict during operation of the system.

27 Claims, 5 Drawing Sheets

| Device | Operating Frequency Capability | Priority | Preferred Frequency | Shielded? | Effected by Interference? |
|---|---|---|---|---|---|
| Processor | 3.0Ghz, 2.5Ghz, 2.4Ghz, 2.0Ghz, 1.5Ghz, 1.0Ghz, 500Mhz, 100Mhz | 1 | 3.0Ghz | Yes | No |
| Bus Interface | 2.5Ghz, 2.0Ghz, 1.8Ghz, 1.0Ghz | 2 | 2.5Ghz, 2.4Ghz | No | No |
| Main Memory | 2.5Ghz, 2.4Ghz, 2.0Ghz, 1.8Ghz | 2 | 2.5Ghz, 2.4Ghz | Yes | No |
| Bridge | 2.5Ghz, 2.4Ghz, 2.0Ghz, 1.5Ghz, 1.0Ghz, 500Mhz, 100Mhz | 2 | 2.5Ghz, 2.4Ghz | Yes | No |
| Interface 114 | 2.5Ghz | 4 | 2.5Ghz | No | Yes |
| Device 116 | 2.5Ghz, 2.3Ghz | 3 | 2.5Ghz | No | No |

METHOD AND APPARATUS FOR DYNAMICALLY RESOLVING RADIO FREQUENCY INTERFERENCE PROBLEMS IN A SYSTEM

FIELD OF THE INVENTION

This invention relates to radio frequency interference. In particular it relates to preventing radio frequencies produced by one or more devices in a system from interfering with an operation of a wireless communications interface forming part of the system.

BACKGROUND

Today, many computer systems have wireless communications interfaces which enable such systems to communicate with other device wirelessly. A challenge of integrating a wireless communications interface with a computer system is to avoid radio interference between the wireless communication interface and other components in the system which produce radio interference waves. Usually, the components which produce interfering radio waves are elctromagnetically shielded. While this approach can be effective, it is not always technically feasible, particularly in cases where a wireless communications interface is added to an existing computer system in which there is an existing component which has not been electromagnetically shielded such as a bus interface which may generate radio interference.

DETAILED DESCRIPTION

Figure 1:
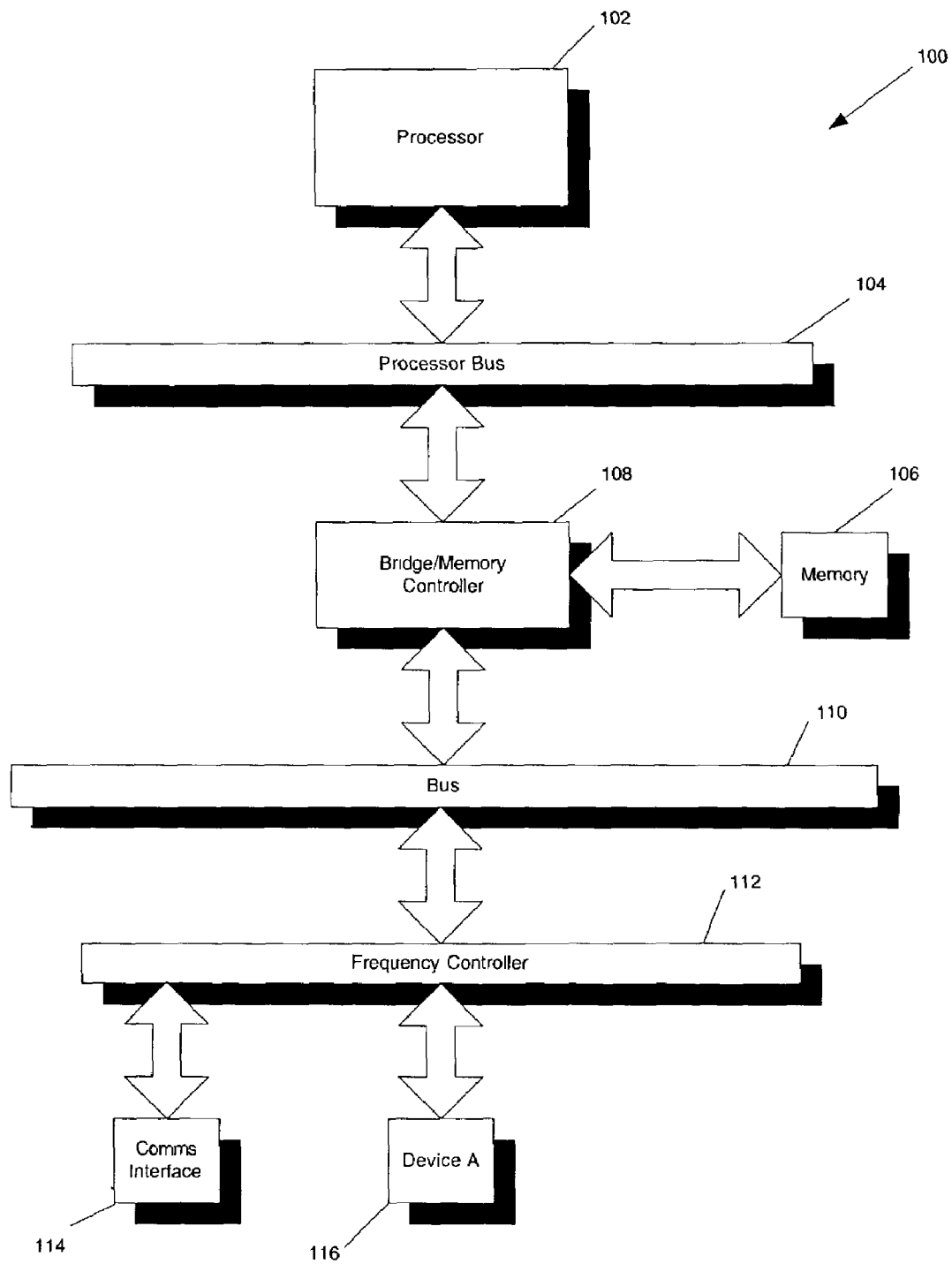
FIG. 1 of the drawings shows an example of a system in accordance with one embodiment of the invention.

FIG. 1 of the drawings shows a system 100 in accordance with one embodiment of the invention. The system 100 includes a processor 102 that processes data signals. Processor 102 may be a Complex Instruction Set Computer (CISC) microprocessor, a Reduced Instruction Set Computing (RISC) microprocessor, a Very Long Instruction Word (VILW) microprocessor, a processor implementing a combination of instructions sets, or other processor device.

In one embodiment, processor 102 is a processor in the Pentium® family of processors including the Pentium® 4 family and mobile Pentium® processors available from Intel Corporation in Santa Clara, Calif. Alternatively, other processors may be used. FIG. 1 shows an example of a system employing a single processor. However, one of ordinary skill in the art will appreciate that system 100 may be implemented using multiple processors.

Processor 102 is coupled to a processor bus 104. Processor bus 104 transmits data signals between processor 102 and other components in system 100. System 100 also includes a memory device 106. In one embodiment, memory 106 is a Dynamic Random Access Memory (DRAM) device. However, in other embodiments, memory 106 may be a Static Random Access Memory (SRAM) device, or other memory device.

Memory 106 may store instructions or code represented by data signals that may be executed by processor 102. According to one embodiment, a cache memory (not shown) within processor 102 stores data signals that are also stored in memory 106. The cache memory speeds up memory access by processor 102 by virtue of its proximity to a CPU located within processor 102. In another embodiment, the cache memory may reside external to processor 102.

System 100 further includes a bridge memory controller 108 coupled to processor bus 104 and memory 106. Bridge/memory controller 108 directs data signal between processor 102, memory 106, and other components in system 100 and bridges the data signal between processor bus 104, memory 106, and a first input/output (I/O) bus 110. In one embodiment, I/O bus 110 may be a single bus or a combination of multiple buses.

In a further embodiment, I/O bus 110 may be a Peripheral Component Interconnect adhering to a Specification Revision 2.1 bus defined by PCI Special Interest Group of Portland, Oreg. In another embodiment, I/O bus 110 may be a Personal Computer Memory Card International Association (PCMCIA) bus defined by PCMCIA of San Jose, Calif. Alternatively, other buses may be used to implement I/O bus 110. I/O bus 110 provides communications link between components in system 10. A frequency controller 112 is coupled to I/O bus 110. Frequency controller 112 allows coupling of various devices to system 100 and acts as an interface between the various devices and system 100. In the embodiment shown, a communications interface 114 and a device 116 are coupled to frequency controller 112. Although only two devices are shown coupled to frequency controller 112 it will be appreciated that in other embodiments more than two devices may be coupled to frequency controller 112. The communications interface 114 provides wireless connectivity to system 100 and may include interfaces which support wireless communications in accordance with the standards known as Blue Tooth and IEEE 802.11. Other wireless communication standards or protocols may also be supported.

The various components of system 100 described above operate at different operating frequencies. These frequencies are tabulated in Table 400 shown in FIG. 4 of the drawings. Referring to the operating frequencies shown in Table 400, it will be seen that certain component operate at frequencies which produce radio interference with communications interface 114. One advantage is that frequency controller 112 controls the operating frequencies of the various devices in system 100 so as to reduce radio interference with communications interface 114. As will be described in greater detail below, memory 106 stores a table similar to Table 400, which allows frequency controller 112 to dynamically control operating frequencies of the various components of system 100 to avoid radio interference with communications interface 114.

Figure 2:
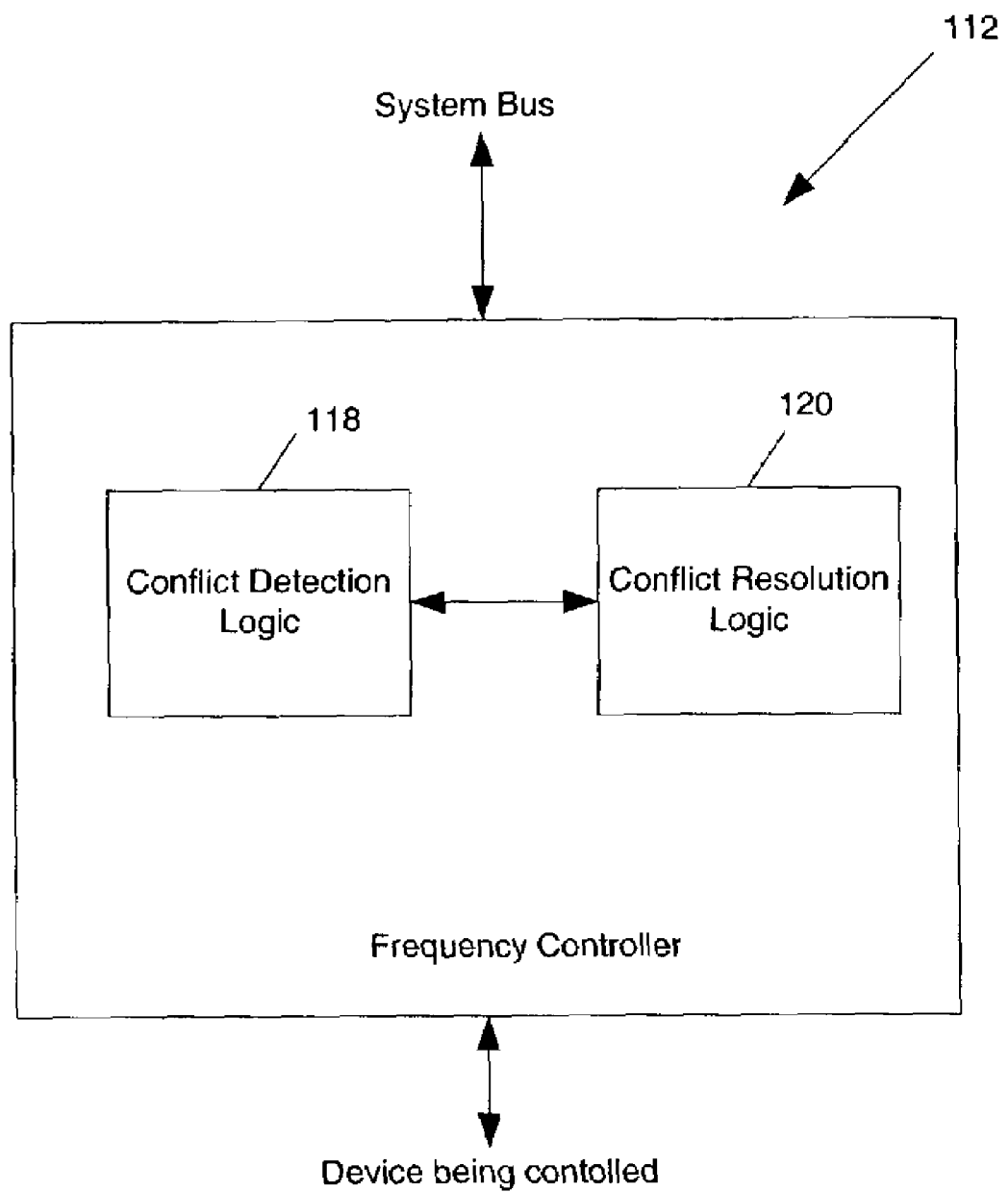
FIG. 2 shows the frequency controller of FIG. 1 in greater detail.

The components of frequency controller 112 are shown in greater detail in FIG. 2 of the drawings. Referring to FIG. 2, frequency controller 112 includes conflict detection logic 118 to detect conflicting component/devices of system 100 which produce radio frequency interference which interferes with an operation of communications interface 114. Frequency controller 112 also includes conflict resolution logic 120 which resolves frequency conflicts dynamically during operation of system 100, as will be described in greater detail below.

Figure 3:
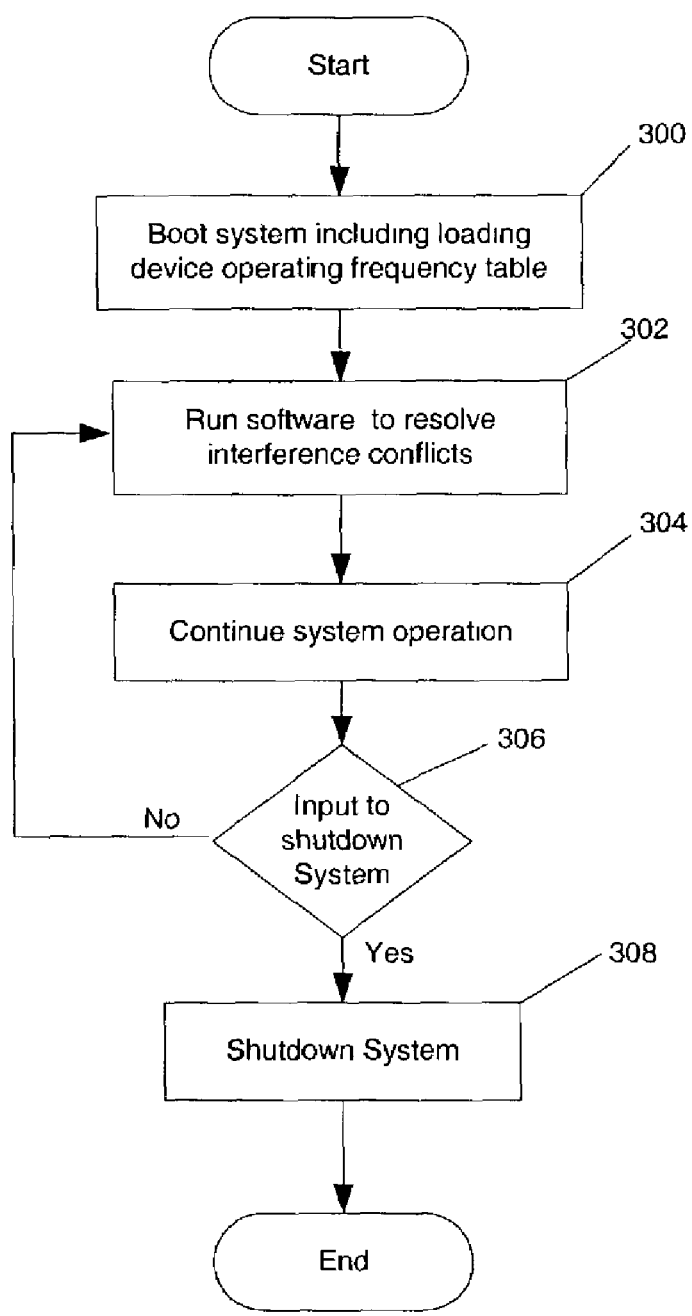
FIG. 3 shows a flow chart of operations performed during operation of the system shown in FIG. 1 of the drawings.

FIG. 3 of the drawings shows a flow chart of operations performed during operation of system 100. Starting at 300, system 100 is booted. This includes loading a device operating frequency table (such as the Table 400 shown in FIG. 4 of the drawings) into memory 106. The device operating frequency table may be read from a non-volatile memory or alternatively it could be read from a mass storage device such as a hard disk. At block 302 software to resolve interference conflicts is run. At block 304 the operation of system 100 continues with a check being performed at 306 to determine if input has been received to shut down system 100. If no input has been received to shut down system 100 the operation of system 100 continues at block 304. If input to shutdown system 100 has been received then at block 308 system 100 is shut down. New devices which may cause interference may be added to system 100 at any time. Therefore control goes from 306 to 302.

Figure 4:
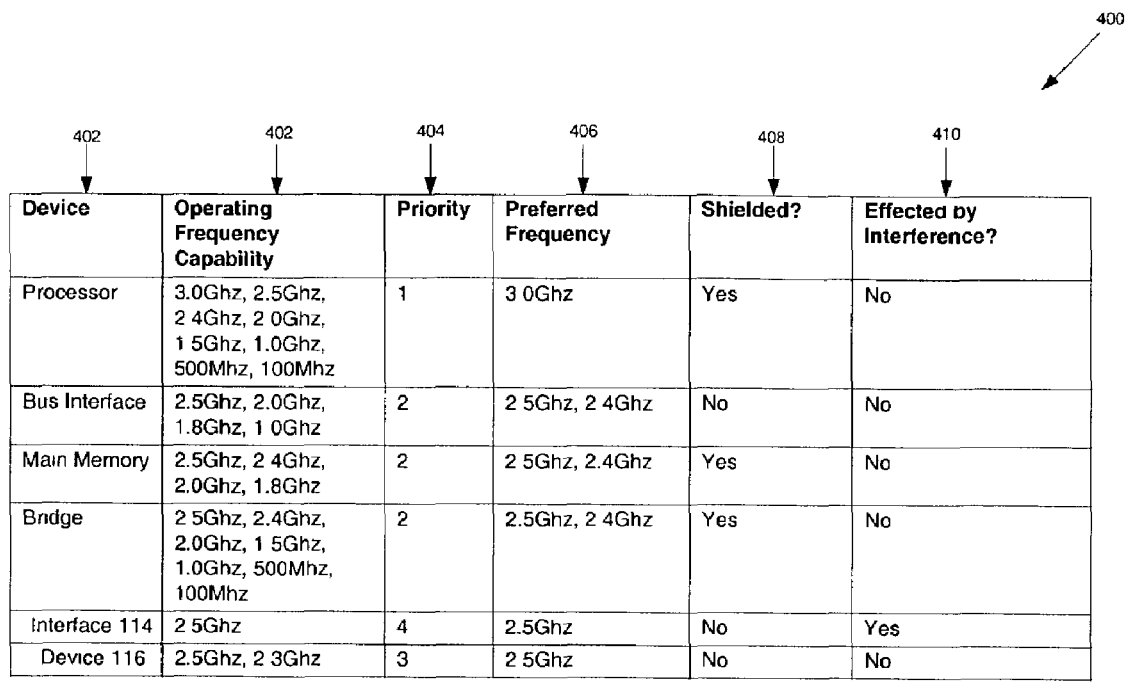
FIG. 4 shows and exemplary table which may be used to resolve operating frequency conflicts in accordance with one embodiment of the invention.

As noted above, dynamically controlling the operating frequencies of the various components of system 100 to reduce radio interference with communications interface 114 involves the use of a table, for example, Table 400 in FIG. 4 of the drawings. Table 400 includes a column 402 which identifies the various components/devices in system 100. Column 402 indicates the operating frequency at which the devices in column 400 can operate. Column 404 indicates a priority of the various devices in column 402. In one embodiment, the priority is an integer greater than or equal to one. According to this embodiment, a device having a priority of one enjoys a highest priority. A device's priority progressively reduces as it is assigned a higher integer value. Thus, in Table 400, device 116 having been assigned a priority of four enjoys the lowest priority. In accordance with embodiments to be described fully below, in order to resolve detected frequency conflicts, the operating frequency of low priority devices are first changed. If a conflict cannot be resolved without having to change the operating frequency of a high priority device, then a user is notified and input is received from the user as to whether to change the operating frequency of the high priority device or not. In column 404, it will be seen that processor 102 has been assigned a priority of one which is the highest priority. Thus, the operating frequency of processor 102 will not be changed without notifying a user and receiving the user's input to change the operating frequency of processor 102. Table 400 further includes column 406 in which a pre-set operating frequency of each device in column 402 is provided. Column 408 records whether a device is electromagnetically shielded and column 410 specifies whether a device is affected by radio interference. Table 400 is compiled during the boot up of system 100 by an operating system for system 100 and can be updated as devices are added or removed during system operation.

Figure 5:
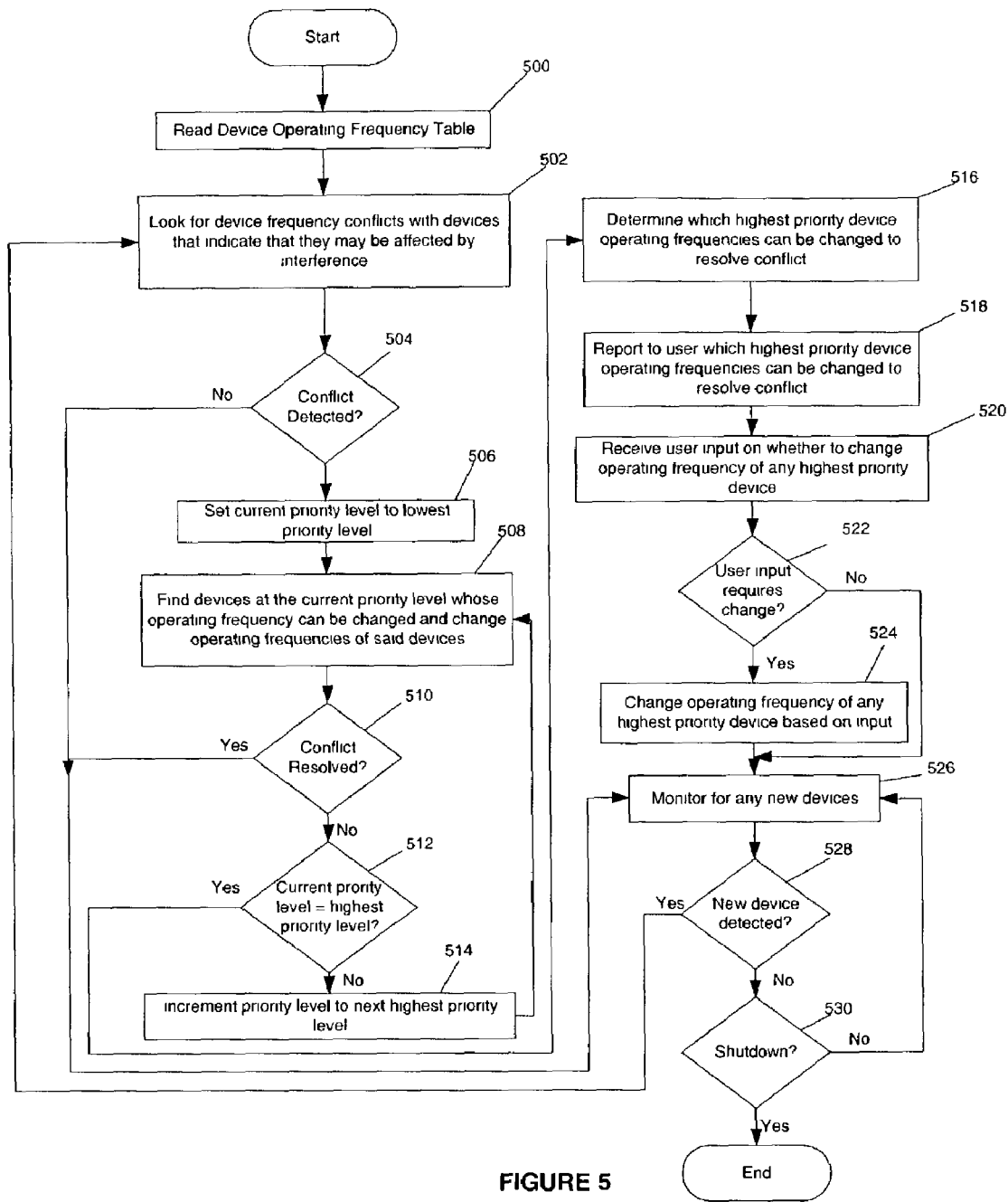
FIG. 5 shows a flow chart of operation performed in resolving operating frequency conflicts in accordance with one embodiment of the invention.

A flow chart of operations performed in dynamically controlling the operating frequencies of the various devices/components of system 100 in order to avoid radio interference with communication interface 114 is shown in FIG. 5 of the drawings. Referring to FIG. 5, at block 500 the device operating frequency Table 400 is read from memory 106. Alternatively, device operating frequencies may be retrieved from each device itself, or from a separate storage location (such as PCI configuration space). The conflict detection algorithm may then poll all system devices at boot time to detect conflicts, and then check for new conflicts as devices are added or removed. At block 502 the software looks for device frequency conflict with devices that indicate that they may be affected by interference. At block 506 it is determined if a conflict has been detected in order to control program flow to two branches. In the first branch if no conflict has been detected then block 526 is executed in which system 100 monitors for new devices that may be plugged in.

If a conflict has been detected at block 504 then block 506 is executed wherein the current priority level is set to the lowest priority level. For example, according to the data in Table 400 the current priority level will be set to four which is the priority level of device 116 in system 100. Block 508 is next executed wherein frequency controller 112 finds those devices at the current priority level whose operating frequency can be changed so as to avoid radio interference with communications interface 114. Block 504 also includes changing the operating frequencies of those devices.

At block 510 a check is performed to determine if the conflict has been resolved. If the conflict has been resolved then block 526 is executed. If the conflict has not been resolved then block 512 is executed wherein a check is performed to determine if the current priority level has been set to the highest priority level. If the current priority level is at the highest priority level then block 516 is executed. Otherwise, block 514 is executed wherein the priority level is incremented to the next highest priority level. In the case of Table 400 the priority level would be set to three which would be the priority level of communications interface 114. Available operating frequencies for a device that are stored in the Table 400 may be ordered in "performance" or "preference" order. This enables the conflict resolution algorithm to pick the most optimal frequencies for device conflicts. Thereafter, block 508 is executed. Thus, blocks 508, 510, 512 and 514 form a loop.

Execution of block 516 causes system 100 to determine which highest priority device's operating frequency can be changed to resolve the conflict. At block 512 a report or notification is sent to a user notifying said user of the highest priority devices whose operating frequencies can be changed to resolve the conflict. At 520 system 100 receives the user's input on whether to change the operating frequency of any highest priority device. At block 522 a check is performed to determine if a user's input requires a change to any of the highest priority devices. If a change is required then block 524 is executed wherein the operating frequency of the highest priority device the user wishes to be changed is changed. Block 524 is then performed wherein system 100 monitors for any new devices which may be plugged in.

At 528 a check is determined if a new device has been detected. If a new device has been detected then block 502 is executed. At block 530 the system 100 determines if input has been received to shut down. If such input has been received then the system 100 shuts down otherwise block 526 is repeated. By performing the operation in FIG. 5 of the drawings, frequency controller 112 will detect that communications interface 114 is affected by interference produced by bus 110 and device 116. The remaining components in Table 400 either operate at a frequency other than the frequency of communications interface 114 or if they operate at the frequency of communications interface 114 then they are electromagnetically shielded which means that they do not interfere with communications interface 114. Frequency controller 112 will therefore set the bus 110 to operate at a frequency of 2.4 gigahertz and device 116 to operate at a frequency 2.3 gigahertz. At these frequencies radio interference produced by bus 110 and device 116 will not interfere with communications interface 114. In accordance with another embodiment, frequency controller 112 will change the operating frequency of a conflicting device in system 100 to operate at its preferred frequency as far as possible.

For the purposes of this specification, a machine-readable medium includes any mechanism that provides (i.e. stores and/or transmits) information in a form readable by a machine (e.g. computer) for example, a machine-readable medium includes read-only memory (ROM); random access memory (RAM); magnetic disk storage media; optical storage media; flash memory devices; electrical, optical, acoustical or other form of propagated signals (e.g. carrier waves, infra red signals, digital signals, etc.); etc.

It will be apparent from this description the aspects of the present invention may be embodied, at least partly, in software. In other embodiments, hardware circuitry may be used in combination with software instructions to implement the present invention. Thus, the embodiments of the invention are not limited to any specific combination of hardware circuitry and software.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method comprising:
   determining if one or more devices in a system is a conflicting device that conflicts with a wireless communications interface in the system by producing radio frequency that interferes with an operation of the wireless communications interface; and
   dynamically resolving each conflict between the one or more devices in the system during operation of the system based on information corresponding to the one or more devices, the information stored in a data structure of the system and including an operating frequency, a priority, a preferred frequency, and
   an electromagnetically shielded indication for the one or more devices.

2. The method of claim 1, wherein the determining comprises accessing the data structure to determine if each device operates at a frequency which overlaps with an operating frequency of the wireless communications interface.

3. The method of claim 2, wherein the determining further comprises determining a device being a conflicting device if it is not electromagnetically shielded and there is overlap.

4. The method of claim 3, wherein dynamically resolving each conflict comprises changing an operating frequency of the one or more conflicting devices so as to avoid the conflict.

5. The method of claim 4, wherein changing the operating frequency is in accordance with the priority of the devices, the operating frequency of a lower priority device been changed before changing the operating frequency of a higher priority device.

6. The method of claim 4, wherein changing the operating frequency comprises selecting a highest operating frequency for a conflicting device, which frequency avoids the conflict.

7. The method of claim 6, further comprising notifying a user if an operating frequency of a high priority device is to be changed.

8. The method of claim 7, further comprising:
   receiving the user's input on whether to change the operating frequency of the high priority device; and
   selectively changing the operating frequency of the high priority device based on the user's input.

9. A computer-readable medium having stored thereon a sequence of instructions which when executed by a processor causes the processor to perform a method comprising:
   determining if one or more devices in a system is a conflicting device that conflicts with a wireless communications interface in the system by producing radio frequency that interferes with an operation of the wireless communications interface; and
   dynamically resolving each conflict between the one or more devices in the system during operation of the system based on information corresponding to the one or more devices, the information stored in a data structure of the system and including an operating frequency, a priority, a preferred frequency, and
   an electromagnetically shielded indication for the one or more devices.

10. The computer-readable medium of claim 9, wherein the determining comprises accessing the data structure to determine if each device operates at a frequency which overlaps with an operating frequency of the wireless communications interfaces.

11. The computer-readable medium of claim 10, wherein the determining further comprises checking if a device is electromagnetically shielded, a device being a conflicting device if it is not electromagnetically shielded and there is overlap.

12. The computer-readable medium of claim 11, wherein dynamically resolving each conflict comprises changing an operating frequency of the one or more conflicting devices so as to avoid the conflict.

13. The computer-readable medium of claim 12, wherein changing the operating frequency is in accordance with the priority of the devices, the operating frequency of a lower priority device being changed before changing the operating frequency of a higher priority device.

14. The computer-readable medium of claim 12, wherein changing the operating frequency comprises selecting a highest operating frequency for a conflicting device, which frequency avoids the conflict.

15. The computer-readable medium of claim 14, wherein the method further comprises notifying a user if an operating frequency of a high priority device is to be changed.

16. The computer-readable medium of claim 15, wherein the method further comprises:
   receiving the user's input on whether to change the operating frequency of high priority device; and
   selectively changing the operating frequency based on the user's input.

17. A system comprising:
   a conflict detection unit to detect if one or more devices in the system is a conflicting device that conflicts with a wireless communications interface in the system by producing radio frequency that interferes with an operation of the wireless communication interface;
   a data structure to store information for the one or more devices, the information including an operating frequency, a priority, a preferred frequency, and an electromagnetically shielded indication for each device in the system; and
   a conflict resolution unit to dynamically resolve each conflict between the one or more devices in the system during operation of the system based on the information stored in the data structure corresponding to the one or more devices.

18. The system of claim 17, wherein dynamically each resolving conflict comprises changing the operating frequency of the one or more conflicting devices to avoid the conflict, devices having a lower priority being changed before devices having a higher priority are changed.

19. The system of claim 18, wherein the conflict resolution unit further to:
  notify a user if a conflict cannot be resolved other than by changing an operating frequency of a high priority device; and
  selectively change the operating frequency of the high priority device based on a response to the notification.

20. A system comprising:
  means for determining if one or more devices in a system is a conflicting device that conflicts with a wireless communications interface in the system by producing radio frequency that interferes with an operation of the wireless communications interface; and
  means for dynamically resolving each conflict between the one or more devices in the system during operation of the system based on information corresponding to the one or more devices, the information stored in a data structure of the system and including an operating frequency, a priority, a preferred frequency, and an electromagnetically shielded indication for the one or more devices.

21. The system of claim 20, wherein the means for determining further includes means for accessing the data structure to determine if each device operates at a frequency which overlaps with an operating frequency of the wireless communications interface.

22. The system of claim 21, wherein the means for determining further includes means for determining a device being a conflicting device if it is not electromagnetically shielded and there is overlap.

23. The system of claim 22, wherein the means for dynamically resolving each conflict includes means for changing an operating frequency of the one or more conflicting devices so as to avoid the conflict.

24. The system of claim 23, wherein the means for changing the operating frequency is in accordance with the priority of the devices, the operating frequency of a lower priority device been changed before changing the operating frequency of a higher priority device.

25. The system of claim 23, wherein the means for changing the operating frequency comprises selecting a highest operating frequency for a conflicting device, which frequency avoids the conflict.

26. The system of claim 25, further comprising means for notifying a user if an operating frequency of a high priority device is to be changed.

27. The system of claim 26, further comprising:
  means for receiving the user's input on whether to change the operating frequency of the high priority device; and
  means for selectively changing the operating frequency of the high priority device based on the user's input.

* * * * *